INVENTORS.
ROBERT F. STAMM
PETER A. BUTTON
BY
ATTORNEY.

Nov. 4, 1958 R. F. STAMM ET AL 2,858,727
DEVICE FOR THE MEASUREMENT OF ABSOLUTE TURBIDITY
Filed June 30, 1954 2 Sheets-Sheet 2

INVENTORS.
ROBERT F. STAMM
PETER A. BUTTON
BY
ATTORNEY.

United States Patent Office 2,858,727
Patented Nov. 4, 1958

2,858,727

DEVICE FOR THE MEASUREMENT OF ABSOLUTE TURBIDITY

Robert F. Stamm and Peter A. Button, Stamford, Conn., assignors to American Cyanamid Company, New York, N. Y., a corporation of Maine Application June 30, 1954, Serial No. 440,364

5 Claims. (Cl. 88—14)

This invention relates to an improved device for the measurement of absolute turbidity.

Light scattering investigations have become of increasing importance in recent years because of the applicability of this method to the determination of molecular weights of high polymers in solution.

The theory of scattering of light by solutions is utilized in evaluating weight-average molecular weights according to the turbidimetric method of Debye [J. Phys. Colloid Chem. 51, 18 (1947)]. The turbidity due to concentration fluctuations is related to the molecular weight according to the equation:

$$Hc/\tau_2 = \frac{1}{M} + 2Bc$$

where $$H = \frac{32\pi^3}{3\lambda^4 N_0} n_0^2 \left(\frac{\Delta n}{\Delta c}\right)^2$$

$\lambda$ = wave length of radiation employed $N_0$ = Avogadro's number $n_0$ = refractive index of solvent $\frac{\Delta n}{\Delta c}$ = refractive index gradient with concentration $c$ = concentration in grams/cc.

$\tau_2$ = turbidity due to concentration fluctuations $M$ = weight-average molecular weight $B$ = a constant It is to be observed that since the determination of the molecular weight is directly related to the turbidity due to concentration fluctuations, and since these values may be measured directly or by comparison with a turbidimetric standard, it is highly important that the value of the standard be free from error or otherwise the molecular weight determination is also erroneous.

The present invention is concerned with an improved device for the measurement of the absolute turbidity of the standard or of solutions for use in molecular weight determination.

Figure 1:
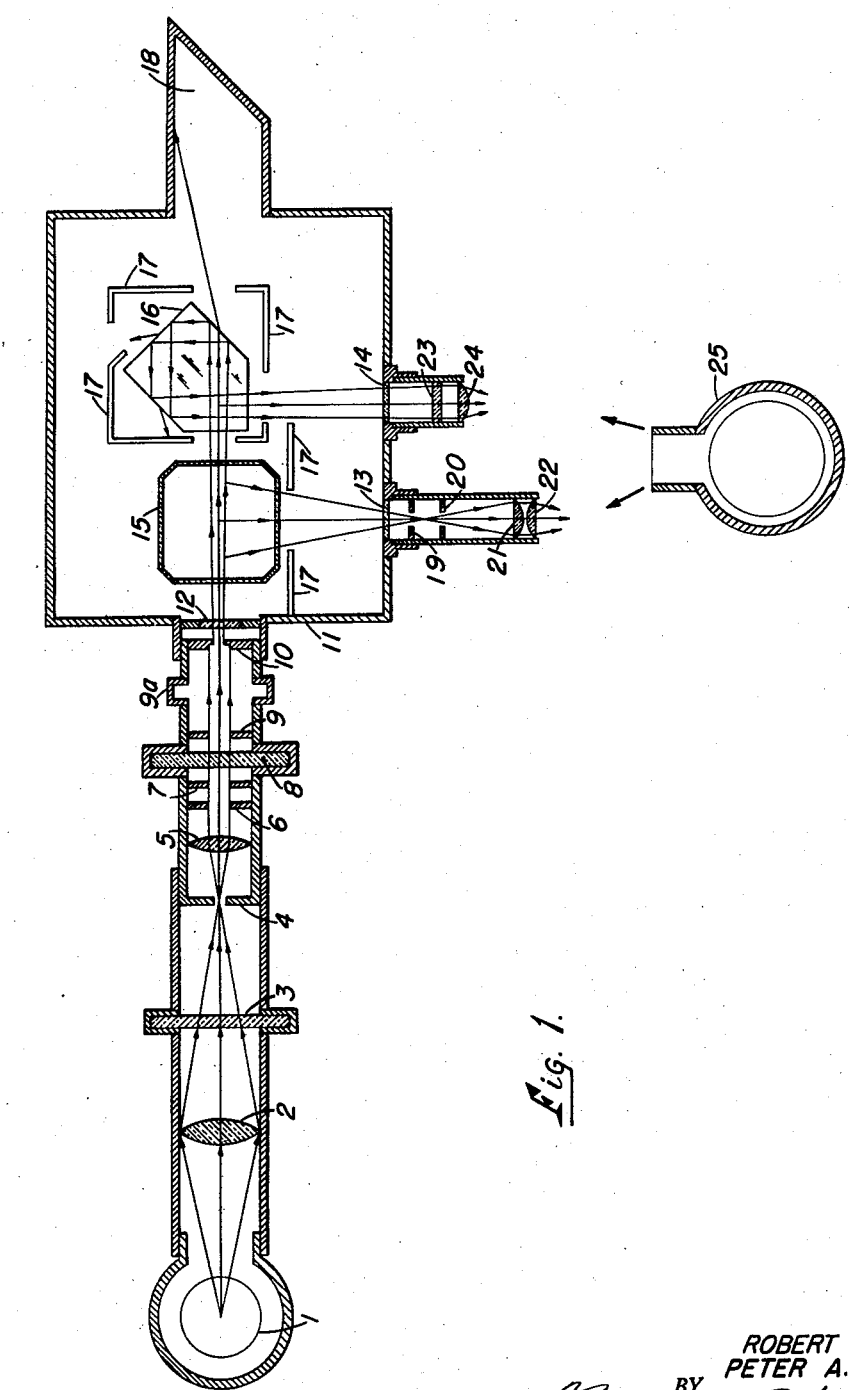
Figure 2:
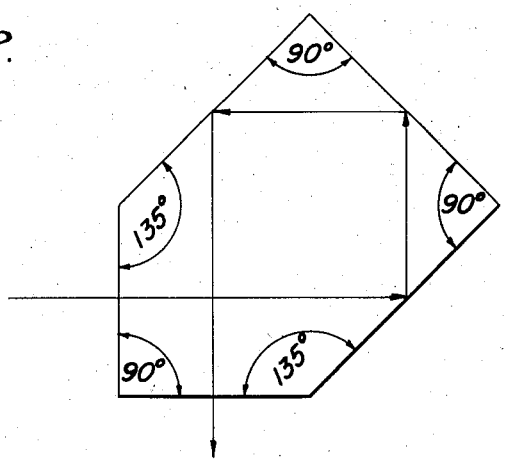
Figure 3:
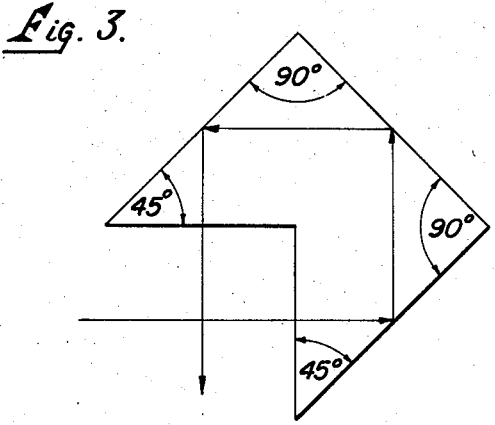

Fig. 1 of the accompanying drawings is a sectional plan view of the improved device;

Fig. 2 is a view in cross-section of a novel beam weakener employed with the device shown in Fig. 1; and Fig. 3 is a view of a modification thereof.

Referring to Fig. 1 of the drawings, light originating in mercury arc source 1 is collected by means of lens 2 and passes through filter 3 which removes some of the unwanted radiation, and is focused on the square slit 4. Square slit 4 is at the focal point of lens 5 so as to send parallel light through circular diaphragms 6, 7 and 9 and interference filter 8. A suitable polarizer at 9a may be interposed in the path of the parallel light beam just beyond filter 8. The radiation passes through square diaphragm 10 and enters water tank 11 which is provided with three apertures 12, 13 and 14 provided with clear glass windows. The radiation passes through aperture 12 and through cell 15 which contains the sample of liquid, the turbidity of which is to be measured. Cell 15 is conveniently a glass container provided with flat surfaces as indicated so as to permit the undeviated passage of light therethrough. The incident beam passes through the cell and through the sample of liquid where it strikes the solid glass prism or beam weakener 16. The incident beam enters the beam weakener normal to the first surface and is attenuated in intensity by three successive reflections from liquid-glass interfaces at known angles of incidence which in this case are 45°. The reflection and transmission coefficients at these interfaces will depend upon the indices of liquid and glass and upon the angle of incidence. The actual numerical values can be calculated from Fresnel's equations. The liquid employed must be one whose refractive index will remain stable with time. Suitable baffles 17 are provided to eliminate sources of stray light. As is apparent, a portion of the incident beam passes through the beam weakener and enters light trap 18. The attenuated incident beam passes from beam weakener 16 through aperture 14. The scattered radiation passes through aperture 13. Suitable rectangular diaphragms 19 and 20 are provided adjacent to the outer surface of aperture 13. Also positioned in proximity to diaphragms 19 and 20 are suitable plano-convex lenses 21 and 22, and adjacent to aperture 14 is a plano-cylindrical lens 23 and a plano-convex lens 24 which collect all of the radiation from the glass beam weakener.

The purpose of lenses 21, 22, 23 and 24 is to focus the scattered and incident beams on the cathode of a multiplier phototube (type 1P21 or 931–A), made for example by RCA, positioned within housing 25 so as to make both scattered and incident beam images the same size and to bring both of them to the same position on the cathode. It has been found that the tube will measure intensity ratios correctly only under these conditions. As is apparent, the photomultiplier tube may be shifted from apertures 13 and 14 as desired in order to measure successively the scattered radiation and the incident radiation which has been attenuated a known amount by the action of the beam weakener.

In practice, it has been found that good results in particular are secured by the use of an end-on multiplier phototube, for example, Dumont type 6291. When such a phototube is employed, lenses 21, 22, 23 and 24 may be omitted provided the illuminated area of the cathode is substantially the same in the two beams.

The novel beam weakeners employed with the apparatus of Fig. 1 are shown more in detail in Figs. 2 and 3, Fig. 2, representing beam weakener 16 as used in the device of Fig. 1, and Fig. 3 representing a modification thereof with part of the prism cut away.

The beam weakeners are made of colorless, optical-quality glass free from bubbles and inclusions. The sides are all surface polished flat to within one-quarter of wave length of 5461 A. units. All angles are ±5' of arc, The obtuse angles of the beam weakener shown in Fig. 2 are 135°, the remaining angles being, of course, 90°. The acute angles of the beam weakener shown in Fig. 3 are 45° and the remaining angles 90°.

Both of the described beam weakeners have been found in actual practice to provide a simple way of weakening a beam of light by a factor of the order of $5 \times 10^{-6}$ and of a known amount so that the intensity of the very weak light scattered by a pure, dust-free liquid may be measured relative to that of the small, known fraction of the incident beam.

Although the invention has been more particularly described in connection with beam weakeners which produce multiple reflections, it is also within the scope of the present invention to use a glass prism which produces only a single reflection at the liquid-glass interface. For example, an ordinary glass prism having two angles of 45° and one of 90° immersed in a liquid whose refractive index nearly matches that of the glass in the wavelength desired may be used. Such a combination would achieve the desired result with only one reflection. However, since it is difficult to find a liquid having the desired optical properties and one which is stable with time, nonhydroscopic and inert toward all of the elements inside the liquid bath, it is preferred to use the prisms shown in Figs. 2 and 3, each of which involve three reflections.

In obtaining a value for turbidity or 90° scattering power from the experimental values of relative intensities of scattered beam and reference beam measured by the present device, it is necessary to employ certain mathematical and arithmetical calculations which while forming no part of the present invention must be taken into consideration.

These calculations involve the sizes and separation of the apertures 19 and 20, the transmission coefficients of the lenses 21–24, inclusive, the reflectivity of the beam weakener, the correction for the extra light in the reference beam attributable to scattering from glass or water, the refractive indices of the various media involved, the geometrical distance from the center of the scattering cell to aperture 19, the preferential response of the phototube to vertically- and horizontally-polarized light, and (if there is such a preference) the depolarization ratio of the light scattered by the liquid. All of these factors must be taken into account in interpreting the results obtained with the present device. However, they have no direct bearing on the apparatus of the present invention as such.

We claim:

1. A device for the measurement of absolute turbidity of a liquid which comprises, in combination, a liquid bath, a cell immersed in said liquid bath containing a sample of liquid whose light scattering ability is to be measured, a beam weakener immersed in said liquid bath composed of at least one element for producing reflections at a glass-liquid interface in which the measured beam is partially reflected internally in glass from a glass-liquid interface, serving to weaken the incident beam by a predetermined calculatable amount, such that the intensity of the weakened beam is of the order of magnitude of the sample scattered light, an optical system so positioned as to direct a beam of essentially monochromatic parallel light through said liquid bath and successively through each of said sample cell and said beam weakener, and means for measuring the intensity of the scattered light and the intensity of the weakened beam.

2. A device for the measurement of absolute turbidity of a liquid which comprises, in combination, a liquid bath provided with a plurality of apertures, an optical system so positioned as to direct a beam of essentially monochromatic parallel light through one of said apertures, a cell containing a sample of liquid whose light-scattering ability is to be measured positioned in the bath and adjacent to the aperture through which the parallel beam is passed, and a beam weakener composed of at least one element for producing reflections at glass-liquid interfaces positioned in the path of said beam and serving to weaken the incident beam a predetermined calculatable amount, such that the intensity of the weakened beam is of the order of magnitude of the sample scattered light, said beam weakener being located in the path of said beam of light beyond the sample cell, a scattered light collecting means to pass scattered light through a second of said apertures, a weakened-beam light collecting means adjacent to a third aperture, and means to measure the intensity of light scattered by said sample cell and the intensity of the light emanating from said beam weakener.

3. A device according to claim 2 in which the beam weakener comprises a flat-surfaced, seven-sided solid glass prism having two obtuse angles of 135°, the remaining angles being 90°, and the light is reflected internally of the prism three times from glass-liquid interfaces.

4. A device according to claim 2 in which the beam weakener comprises a flat-surfaced, seven-sided solid glass prism having two acute angles of 45°, the remaining angles being 90°, and the light is reflected internally of the prism three times from glass-liquid interfaces.

5. A device according to claim 2 in which the beam weakener comprises a seven-sided glass prism for immersion in a liquid, said prism having five flat working surfaces, the second and fourth of which surfaces are parallel, a third surface at right angles to the second and fourth surfaces, said second, third, and fourth surfaces comprising glass-liquid reflecting surfaces, and a first and fifth light transmitting surface, which surfaces when extended form an angle of 45° with said third surface and which are at 90° with each other, all of said surfaces being perpendicular to a common plane and the light is reflected internally of the prism three times from said glass-liquid reflecting surfaces.

References Cited in the file of this patent

UNITED STATES PATENTS

| Number | Name | Date |
|---|---|---|
| 1,277,040 | Brewster | Aug. 27, 1918 |
| 1,569,342 | Vernes et al. | Jan. 12, 1926 |
| 1,971,443 | Exton | Aug. 28, 1934 |
| 2,045,124 | Cummins et al. | June 23, 1936 |
| 2,213,307 | Elliot | Sept. 3, 1940 |
| 2,309,268 | Noske | Jan. 26, 1943 |
| 2,436,262 | Miller | Feb. 17, 1948 |